United States Patent [19]
Paulson et al.

[11] Patent Number: 4,524,115
[45] Date of Patent: Jun. 18, 1985

[54] VOLTAGE STABILIZING AGENTS FOR CELLS

[75] Inventors: John W. Paulson; David J. Schulz, both of Madison, Wis.

[73] Assignee: Rayovac Corporation, Madison, Wis.

[21] Appl. No.: 442,868

[22] Filed: Nov. 19, 1982

[51] Int. Cl.$^3$ .................. H01M 10/44; H01M 4/58
[52] U.S. Cl. ........................ 429/50; 429/218; 429/104; 429/220; 252/182.1
[58] Field of Search ......... 429/220, 221, 101, 103, 429/104, 106, 107, 218, 50, 194, 197; 252/182.1

[56] References Cited

U.S. PATENT DOCUMENTS

| | | | |
|---|---|---|---|
| 3,506,490 | 4/1970 | Buzzelli | 429/218 |
| 4,163,829 | 8/1979 | Kronenberg | 429/194 |
| 4,306,005 | 12/1981 | Ruben | 252/182.1 |
| 4,332,869 | 6/1982 | Margalit et al. | 429/221 |
| 4,336,315 | 6/1982 | Eda et al. | 429/194 |
| 4,343,714 | 8/1982 | Joshi et al. | 429/218 |
| 4,383,014 | 5/1983 | Armijo et al. | 429/221 |

*Primary Examiner*—Brian E. Hearn
*Assistant Examiner*—Hunter L. Auyang
*Attorney, Agent, or Firm*—Kenyon & Kenyon

[57] ABSTRACT

A cell, having a metallic hydroxide, oxide, oxyhydroxide or hydrated oxide added to the cathode. The addition of these compositions to a nonaqueous cell reduces the open circuit voltage (OCV) of a fresh cell in a relatively short period of time; therefore obviating the need for burning in new cells.

2 Claims, No Drawings

VOLTAGE STABILIZING AGENTS FOR CELLS

TECHNICAL FIELD

This invention relates to high energy, nonaqueous cells in general and more particularly to cathodic additives for stabilizing the initial open circuit voltage (OCV) of such cells.

BACKGROUND ART

The development of high energy cell systems requires the compatibility of an electrolyte possessing desirable electrochemical properties with highly active anode materials, such as lithium, calcium, sodium and the like, and the efficient use of high energy density cathode materials, such as $FeS_2$, $SOCl_2$, $Co_3O_4$, $PbO_2$ and the like. The use of aqueous electrolytes is precluded in these systems, since the anode materials are sufficiently active to chemically react with water. Therefore, in order to realize the high energy density obtainable through use of these highly reactive anodes and high energy density cathodes, it is necessary to use a nonaqueous electrolyte system.

Many cell or battery applications, such as hearing aids, cameras, games, watches, calculators, and the like, require a substantially unipotential discharge source for proper operation. However, it has been found that in many nonaqueous cells employing positive active materials which include a conductive additive such as graphite and/or carbon, the cell upon initially being discharged, exhibits a high voltage whereupon the cell then proceeds to reach its lower operative discharge voltage level only after a certain time period has elapsed. The time period for the cell to reach its intended operating discharge voltage level usually depends on the discharge rate through the load and thus, depending on the apparatus it is to power, could result in a period extending up to several hours or even days. This phenomenon has serious drawbacks when a cell is intended to be used in electronic devices requiring a substantially unipotential discharge source for proper operation. In some of these electronic devices, any initial voltage peak substantially exceeding the intended operating volatage for the device could result in serious damage to the electronic components of the device. One approach to protect devices from batteries exhibiting high voltages prior to leveling off to their desired operating voltage level is to add additional electronic circuit components to protect the main operating components of the device. However, this not only adds to the expense of the device but also would result in enlarging the device to accommodate the protective circuitry. With the emphasis placed on miniaturization, it has become necessary for the battery industry to design smaller and smaller miniature power cells.

It has been found through experience that certain cathode formulations (such as FeS, CuS, $Bi_2S_3$, CdO, etc.) contain traces of high voltage impurities that oftentimes lead to the undesirably high initial open circuit voltages. In order to stabilize (that is, reduce) the voltage in new cells, battery manufacturers sometimes resort to a method called "burning in" in which the cell is purposely discharged a predetermined amount before shipment.

In particular, in the lithium-copper sulfide system (Li/CuS), the copper sulfide cathode is made by: (1) blending $Cu^o$ powder, $S^o$ powder, CuS and C; (2) compressing the mixture into pellet form; and (3) sintering the pellet at about 250° C., so as to combine the $Cu^o$ and $S^o$ to form CuS into a cemented cathode of sufficiently high strength to resist breaking. The Li/CuS couple is ideally designed to have an open circuit voltage (OCV) of 2.15 volts per cell but new cells exhibit an excess OCV in the range of about 2.3 to 2.5 volts. As was alluded to earlier, this is undesirable, since excess voltage may be injurious to a device utilizing the cell. Furthermore, it is difficult to utilize OCV as a quality control criterion if it is not uniform.

Heretofore, in order to reduce the excess OCV to a desirable 2.15 volts, the cells would be subject to a burn in amounting to no more than a few percent of the cell's ampere-hour capacity which, in fact, does bring the OCV to 2.15 volts (e.g., one ohm discharge for one minute). Apparently, there is a higher (cathodic) potential specie on the cathode particle surface and the brief discharge reduces it so as not to interfere with the desired CuS potential.

It should be acknowledged that this undesirable OCV phenomenon is not limited to Li/CuS systems. Rather, it occurs with most lithium based systems.

SUMMARY OF THE INVENTION

There is provided means for eliminating the need for burning in a cell. A metal hydroxide such as lithium hydroxide (LiOH) is added to the cathode before it is inserted into the cell. The addition of metal hydroxide appreciably reduces the OCV in a relatively short period of time. Other metallic hydroxides, oxides, oxyhydroxides and hydrated oxides, depending on the composition of the cell, may be alternatively employed.

PREFERRED MODE FOR CARRYING OUT THE INVENTION

The instant invention contemplates the addition of metal hydroxides, metal oxides, metal oxyhydroxides and metal hydrated oxides to nonaqueous cells.

In particular, the addition of lithium hydroxide (LiOH) has been successful in lowering the OCV of lithium-based nonaqueous cells.

EXAMPLE 1

It was observed that the addition of about 5% LiOH (by weight) to a CuS cathode mixture reduced the resultant OCV to essentially 2.15 volts within twenty hours after cell assembly.

The cathode mix is as follows:

|  | Wt. % |
| --- | --- |
| CuS (cupric sulfide) | 55.24 |
| $Cu^o$ (copper powder) | 20.95 |
| $S^o$ (sulfur) | 10.48 |
| C (graphite) | 8.57 |
| LiOH (lithium hydroxide) | 4.76 |
|  | 100.00 |

The lithium hydroxide was vacuum dried at 200° C. for two hours before blending it in with the other materials in a pebble mill. The above components were then compressed and sintered at about 250° C. to form a cathode pellet.

Six Li/CuS cells were constructed in the above manner. The results are given in Table I.

EXAMPLE 2

The addition of lithium hydroxide to the cathode of a Li/FeS (lithium/iron sulfide) nonaqueous cell similarly depresses the OCV in new cells.

Table 2 shows the lowering effect on OCV by about 5% LiOH (by weight) additions to the FeS cathode. Standard deviations suggest less variation in initial OCV from cell-to-cell with the LiOH present.

TABLE 1

| | OPEN CELL VOLTAGE-HOURS AFTER MANUFACTURE | | | | | | | | | |
|---|---|---|---|---|---|---|---|---|---|---|
| Cell | Hours | | | | | | | | | |
| Number | 21.5 | 23.0 | 24.5 | 89.0 | 137.0 | 187.0 | 257.0 | 305.0 | 353.5 | 428.0 |
| | LiOH in CuS Cathode | | | | | | | | | |
| 1 | 2.1536 | 2.1531 | 2.1526 | 2.1454 | 2.1439 | 2.1430 | 2.1421 | 2.1417 | 2.1416 | 2.1412 |
| 2 | 2.1555 | 2.1549 | 2.1542 | 2.1445 | 2.1425 | 2.1415 | 2.1405 | 2.1502 | 2.1402 | 2.1399 |
| 3 | 2.1567 | 2.1563 | 2.1558 | 2.1487 | 2.1469 | 2.1457 | 2.1447 | 2.1442 | 2.1440 | 2.1433 |
| 4 | 2.1579 | 2.1574 | 2.1570 | 2.1496 | 2.1477 | 2.1465 | 2.1455 | 2.1450 | 2.1447 | 2.1441 |
| 5 | 2.1576 | 2.1570 | 2.1563 | 2.1472 | 2.1451 | 2.1441 | 2.1431 | 2.1427 | 2.1426 | 2.1421 |
| 6 | 2.1570 | 2.1563 | 2.1555 | 2.1444 | 2.1421 | 2.1410 | 2.1400 | 2.1397 | 2.1397 | 2.1393 |
| Average OCV | 2.1564 | 2.1558 | 2.1552 | 2.1466 | 2.1447 | 2.1436 | 2.1427 | 2.1423 | 2.1421 | 2.1417 |

TABLE 2

| No. | % LiOH in FeS Cathode | Initial Average OCV | OCV Value Range | Standard Deviation ($\sigma$) of OCV | Average Performance* on 6500 $\Omega$ Load, to 1.2 v | | |
|---|---|---|---|---|---|---|---|
| | | | | | Time, Hours | mAh | Av. CCV |
| 1 | 0 | 2.33 | 1.5–2.41 | .197 | 195 | 41 | 1.36 |
| 2 | 5 | 2.23 | 2.19–2.26 | .021 | 193 | 39 | 1.32 |
| 3 | 2 | 2.26 | 2.23–2.29 | .020 | 194 | 40 | 1.34 |

*XR1121 Button cell size; Li/LiClO$_4$ solution/FeS System.
LiClO$_4$ electrolyte solution = 1 molar LiClO$_4$ dissolved in solvent mixture consisting of 7 parts by weight propylene carbonate of 3 parts dimethoxyethane (solvents).

Performance to 1.2 volts does not appear to be affected by the LiOH additions. The discharge curve is lowered, as indicated by lower average OCV's, by LiOH addition. Thus, performances to higher endpoints such as 1.8 v and 2.0 v are lower. The endpoint of 1.2 v is considered to be the practical voltage to which the cell is normally used.

The exact mechanism for lowering OCV by LiOH addition has not yet been determined. However, it may be helpful to briefly speculate on a number of theories.

A. Adsorbed Oxygen Cathode

The initially high OCV may be attributed to the following overall reaction:

$$2Li + \tfrac{1}{2}O_2 = Li_2O$$

More specifically, the oxygen consumption and lowered potential (2.15 volts) may involve traces of H$_2$O undoubtedly carried in as LiOH. The cathodic and anodic half reaction of such a mixed cathode could be as follows:

| | |
|---|---|
| $4Li^+ + 4e^- + O_2 \rightarrow 2Li_2O$ | Cathodic reaction |
| $2H_2 + 4OH^- \rightarrow 4e^- + 4H_2O$ | Anodic reaction |
| $8Li + 4H_2O \rightarrow 4Li_2O + 4H_2$ | H$_2$ source |
| $8Li + 4OH^- + 4Li^+ + O_2 \rightarrow 6Li_2O + 2H_2$ | Overall |

As the O$_2$ is consumed, the cathode approaches the targeted potential, giving an overall cell voltage of 2.15 volts. It appears that under this scenario the essential ingredient appears to be bound H$_2$O as the source of hydrogen.

This observation may be borne out by the fact that it is surmised that more H$_2$O is probably initially present in a printed latex bonded CuS cathode (not discussed), a cell which did not exhibit initial OCV's greater than 2.15 volts.

B. Graphitic Acid as Initial O$_2$-Carrying Group

Shawinigan acetylene carbon black used in a printed cathode is very low in surface oxygen, whereas graphite used in a pelleted, heat treated cathode (for example, CuS) may be very high in surface oxygen. This is the so-called "volatiles" in carbon technology and is removed only at very high temperatures (900° C.). Reactions to remove oxygen in graphitic acid carboxyl groups are as follows:

| | |
|---|---|
| $2(COOH) + 8Li^+ + 8e^- \rightarrow 4Li_2O + H_2 + 2C$ | Cathodic |
| $4H_2 + 8OH^- \rightarrow 8e^- + 8H_2O$ | Anodic |
| $16Li + 8H_2O \rightarrow 8Li_2O + 8H_2$ | H$_2$ Source |
| $2(COOH) + 8Li^+ + 8OH^- + 16Li \rightarrow 12Li_2O + 5H_2 + 2C$ | Overall |

The oxygen (in the carboxyl group) is eventually consumed to bring cell OCV to 2.15 volts with the anodic step involving H$_2$ appearing to be essential.

Other theories include that the presence of LiOH provides an abundance of Li$^+$ ion which saturates the CuS surface with Li$_x$CuS (if CuS is the cathode). However, the mechanism (mainly e$^-$ source) is not evident. This surface saturation probably occurs in the first small amount of normal discharging, as in the present burn-in procedure. Another thought involves CuSO$_4$ (a trace of which appears on the surface of the CuS anode) hydrolyzing with H$_2$O to give H$^+$, SO$_4^=$ etc., in which direct neutralization by LiOH may occur. However, a mechanism involving an anodic reaction other than via H$_2$ is not evident.

Other metal hydroxides, metal oxides (ZnO, CaO, K$_2$O, etc.), metal oxyhydroxides and hydrated metal oxides may have similar effects on OCV and afford a means of selectively reducing OCV by desired amounts. Mixtures of hydroxides or oxides may further extend this selectivity.

In summary, by adding lithium hydroxide, other hydroxides or oxides, and mixtures thereof to the cathode in a nonaqueous light metal cell, one can achieve selective control and stabilization of OCV and eliminate costly burn-in discharges during production.

While in accordance with the provisions of the statute, there is illustrated and described herein specific embodiments of the invention. Those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A process for reducing the open circuit voltage of a fresh nonaqueous lithium cell, the cell including a lithium based anode, an electrolyte, and a cathode, the process comprising:
   (a) blending lithium hydroxide, the components of the cathode, and graphite into a mixture;
   (b) compressing the mixture into pellet form, the pellet forming the cathode for the above cell.

2. The process according to claim 1 wherein the pellet is sintered.

* * * * *